(12) United States Patent
Hasharoni et al.

(10) Patent No.: US 8,090,230 B1
(45) Date of Patent: Jan. 3, 2012

(54) METHOD AND DEVICE FOR LIGHT COUPLING

(75) Inventors: Jacob Hasharoni, Sarigim (IL); Michael Mesh, Kfar Saba (IL)

(73) Assignee: Compass Electro-Optical Systems, Natanya (IL)

( * ) Notice: Subject to any disclaimer, the term of this patent is extended or adjusted under 35 U.S.C. 154(b) by 429 days.

(21) Appl. No.: 12/369,784

(22) Filed: Feb. 12, 2009

(51) Int. Cl.
G02B 6/32 (2006.01)
(52) U.S. Cl. ............................ 385/33; 385/88; 385/89
(58) Field of Classification Search .................. None
See application file for complete search history.

(56) References Cited

U.S. PATENT DOCUMENTS

| | | | | |
|---|---|---|---|---|
| 5,546,487 A | * | 8/1996 | Fantone | 385/33 |
| 5,857,042 A | * | 1/1999 | Robertson et al. | 385/33 |
| 7,027,687 B2 | * | 4/2006 | Kishima | 385/33 |
| 7,449,674 B2 | * | 11/2008 | Ueno et al. | 250/227.24 |
| 7,556,440 B2 | * | 7/2009 | Birincioglu et al. | 385/93 |
| 7,764,428 B2 | * | 7/2010 | Hayashi et al. | 359/619 |
| 2004/0091218 A1 | * | 5/2004 | Haasteren | 385/93 |
| 2006/0098292 A1 | * | 5/2006 | Wong et al. | 359/629 |
| 2006/0249661 A1 | * | 11/2006 | Ishigami et al. | 250/216 |
| 2008/0137519 A1 | * | 6/2008 | Ishigami | 369/112.24 |

* cited by examiner

*Primary Examiner* — Michelle R Connelly Cushwa
(74) *Attorney, Agent, or Firm* — Wilmer Cutler Pickering Hale and Dorr LLP

(57) ABSTRACT

An interconnect system for coupling light from a laser light source to an optical fiber having a fiber aperture, the interconnect system including a 2-dimensional array of laser light sources, a 2-dimensional array of micro lenses disposed between 10-200 μm distance from the laser light source, between the laser light source and the optical fiber and in registration therewith, each micro lens comprising a micro lens back surface, a micro lens body, a micro lens front surface, and a clear aperture, the micro lens front surface and back surface being shaped to provide a laser beam in the micro lens body of smaller diameter than the clear aperture for focusing the beam onto the fiber aperture.

10 Claims, 2 Drawing Sheets

METHOD AND DEVICE FOR LIGHT COUPLING

FIELD OF THE INVENTION

The present invention relates to the field of optical systems and, more precisely, to an optical interconnect between an optical source and an optical fiber.

BACKGROUND OF THE INVENTION

In typical optical fiber based optical communication systems, an optoelectronic device having one or more components (i.e., light sources or light detectors) transmits optical signals to, or receives optical signals from, one or more optical fibers. The optical fibers are mounted in a fiber optic connector that positions the ends of the optical fibers in close proximity to the optoelectronic component. A lens is placed between the fibers and the components to focus light into or from the optical fibers. When transmitting, the optoelectronic device converts electrical signals into optical signals and directs the optical signals into the optical fibers. When receiving, the optoelectronic device receives the optical signals from the optical fibers and converts the optical signals into electrical signals.

To provide optimum transfer of an optical signal to or optimum reception of an optical signal from an optical fiber, the optoelectronic component must be precisely aligned in three dimensions relative to the lens, and the combination of the component and the lens must be precisely aligned in three dimensions relative to the end of the optical fiber. If the optical transmission path is not precisely aligned, the quality of the optical communication can be significantly degraded. The core of the optical fiber has cross-sectional dimensions on the order of a few microns to a few tens of microns, and the lens and the optoelectronic device elements have similar cross-sectional dimensions. Precisely aligning the optoelectronic device, the lens, and the core of the optical fiber can be difficult because of the small dimensions. In particular, cross talk between an array of closely arranged VCSELs is problematic, as is the loss of data due to inefficient coupling to the optical fiber.

Therefore, an important step in building fiber optic transmitting and receiving modules for optical communication systems is aligning the optoelectronic component having an array of emitting surfaces with the lens array for optimal light transmission to and from the optical fibers. This alignment is on the three linear axes and a rotational axis to properly focus the light and align the optical paths between the multiple emitting (or receiving) surfaces and the multiple optical fibers to maximize signal strength.

Accordingly, there is a long felt need for an efficient method of coupling a light source, particularly a closely arranged array of light sources, with an array of optical light transmission elements, such as an optical fiber bundle array (FBA), which minimizes cross talk and improves coupling efficiency.

SUMMARY OF THE INVENTION

In accordance with the present invention, a method for building a two dimensional optical interconnect system that minimizes cross talk and other types of interconnect losses is provided. The system incorporates a light source, such as, but not limited to, a 2-dimensional VCSEL array, a 2-dimensional microlens array in registration with the VCSEL array and a 2-dimensional array of optical light transmission elements, such as an optical fiber bundle array (FBA), in registration with the light transmission elements.

This is accomplished by providing an interconnect system for coupling light from a laser light source to an optical fiber having a fiber aperture, the interconnect system including a 2-dimensional array of laser light sources, a 2-dimensional array of micro lenses disposed between 10-200 µm distance from said laser light source, between the laser light source and the optical fiber and in registration therewith; each micro lens including a micro lens back surface, a micro lens body, a micro lens front surface, and a clear aperture, the micro lens front surface and back surface being shaped to provide a laser beam in the micro lens body of smaller diameter than the clear aperture for focusing the beam onto the fiber aperture.

According to a preferred embodiment of the invention, the optical light source facing surface has a radius of curvature $(R_C)$ 0.1 mm±5% and a conic constant k=−1.8±10% resulting in a lens sag of about 0.056 mm, to create a collimated beam less than the clear aperture, and the light transmission element-facing surface has an $R_C$ of 0.27±5% mm and k of −5.0±10% and sag ~0.023 mm. According to another embodiment, the laser light source includes a 2-dimensional array of VCSELs and the passive light transmission element includes a two-dimensional array of optical fibers, each of the fibers being disposed in registration with an associated VCSEL.

There is also provided, according to the invention, a micro lens for coupling light from a laser light source to an optical fiber having a fiber aperture, the micro lens including a micro lens back surface, a micro lens body, a micro lens front surface, and a clear aperture, wherein the optical light source facing surface has a radius of curvature $(R_C)$ 0.1 mm±10%, a conic constant (k) of −1.8±10%, and lens sag of about 0.056 mm, to create a collimated beam less than the clear aperture and the light transmission element-facing surface has an $R_C$ of 0.27 mm±5%, k of −5.0±10% and sag of 0.023 mm.

There is further provided a method for optimizing coupling between an optical light source and a passive optical light transmission element, the method including forming a micro lens having a clear aperture, an optical light source facing surface and a light transmission element-facing surface, shaping the optical light source facing surface with a radius of curvature $(R_C)$ 0.1±0.001 mm, a conic constant (k) of −1.8±10%, and lens sag of about 0.056, to create a collimated beam less than the clear aperture; shaping the light transmission element-facing surface with $R_C$=0.27±5%, k=−5.0±10% and sag ~0.023 to create an incidence angle of a focused beam less than an acceptance angle of the optical light transmission element, and disposing the micro lens between the optical light source and the optical light transmission element at a distance between 10-200 µm from the light source.

BRIEF DESCRIPTION OF THE DRAWING

The present invention will be further understood and appreciated from the following detailed description taken in conjunction with the drawing in which.

DETAILED DESCRIPTION OF THE INVENTION

The present invention relates, in general, to an optical interconnect coupling an optical light source and a passive optical light transmission element. In particular, the invention relates to a device and method for coupling light from a two-dimensional optical source array, particularly a VCSEL array, into a corresponding two-dimensional optical fiber bundle array (FBA), as passive optical light transmission elements. The optical interconnect is characterized by a novel design of a micro-lens, for use in a micro-lens array (MLA), as a means to improve coupling efficiency and minimize crosstalk. Minimizing crosstalk is achieved by efficient collection of the emitted laser radiation on one end, and efficient coupling with the fiber, on the other end. These requirements may be fulfilled if the following two conditions are met: i) the laser-lens separation and the lens shape are set such that most (>99%) of the light is collected by the lens and collimated; and ii) the collimated beam is focused efficiently onto the fiber core with minimal (<1%) light scattering. The described device includes a back illuminating (through a substrate) VCSEL array bonded to a CMOS or other logic control chip; a microlens array (MLA) above the VCSEL substrate and a fiber bundle array positioned above the MLA. All three devices have n×m elements with a pitch that may be as small as 250 μm.

Efficient transfer of the laser energy into its corresponding fiber is a function of the coupling efficiency and crosstalk between the different channels. It has now been appreciated that, therefore, a customized design of the microlens array is required such that both parameters are optimized. In addition, alignment tolerances are very tight due to the two-dimensional (2D) nature of the problem, as the sensitivity to angular deviation in each of the three components is high. For example, correcting angular alignment in one direction can lead to some misalignment in another direction. It follows, thus, that the lens design must take all of the tolerance considerations into account, as well.

Figure 1:
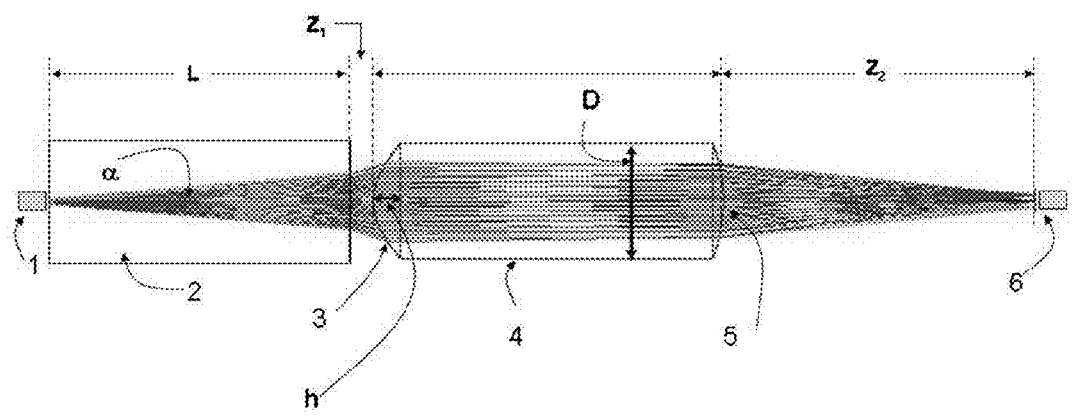
FIG. 1 is a schematic illustration of an interconnect for coupling light, constructed and operative in accordance with one embodiment of the present invention.

FIG. 1 provides a schematic illustration of the geometry of a device for coupling light, according to one embodiment of the invention. The device includes an optical light source, here illustrated as a single VCSEL 1 coupled to a controller (not shown). It will be appreciated that the optical light source can be any laser. However, VCSELs are preferred, as only VCSELs can be made into sufficiently large arrays, at present. For example, VCSEL 1 may be flip-chip bonded to a CMOS logic chip (not shown) and may be a part of a VCSEL array. According to one embodiment of the invention, VCSEL 1 emits light at a wavelength of 970 nm, modulated at a frequency of 10 Gbps, although any desired wavelength or modulation can be used. The VCSEL active layer and electrical connection bumps are on top of a GaAs substrate 2, of any suitable thickness, for example, 625 μm thick.

A micro lens 7 is aligned in registration with the VCSEL 1. Micro lens 7 has two optical surfaces, a back surface 3 and a front surface 5, on a lens body 4. It will be appreciated that the thickness of the lens body is determined by 1) manufacturing limitations and 2) optical performance, given all the parameters. In the particular example illustrated here, lens body 4 can have a thickness of, for example, 730 μm, and a diameter, for example, of 250 um, which is the pitch between the fibers.

Figure 2:
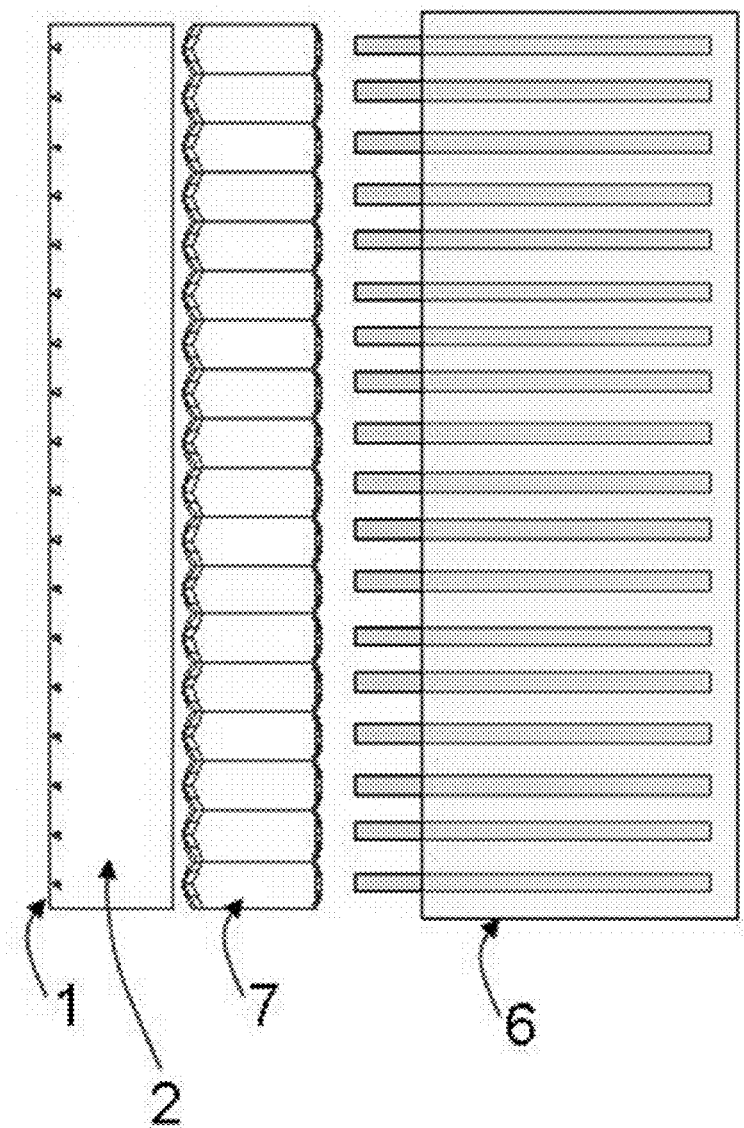
FIG. 2 is a schematic illustration of an interconnect for coupling light, constructed and operative in accordance with another embodiment of the present invention.

A passive optical light transmission element, here shown as an optical fiber 6, is positioned above, and in registration with, microlens 7. It will be appreciated that the device preferably includes a plurality of optical source elements, and a plurality of passive optical light transmission elements, preferably arranged in the same manner as shown in FIG. 1, most preferably a 2-dimensional array of each. This arrangement may include a VCSEL array, for example a 12×14 element array, and a micro lens array (MLA) aligned in registration with the VCSEL array, such that each micro lens is positioned exactly above a corresponding VCSEL. The arrangement further includes a fiber bundle array, which is aligned in registration with the MLA, such that each fiber bundle is exactly above a corresponding MLA element. Such an arrangement is shown schematically in FIG. 2.

The lens surface profile and the separation between elements are calculated as follows. All numbers below are given by way of example, only.

Light radiated by VCSEL 1 has an angle of divergence α. Typical VCSEL divergence angles vary in the range of 20°-30°. A more reliable value of ~35° should be used, as the manufacturer's declaration of divergence angle covers the area between the points where the intensity has dropped to $1/e^2$. As typically acceptable cross talk values are in the range of −20 dB, the laser divergence angle used for lens design must be increased to collect the energy found in the edges of the laser profile. In order to collect, collimate and focus the light, a biconvex micro lens design is required, where the VCSEL-facing surface 3 collimates the light and the fiber-facing surface 5 focuses the light onto the aperture of fiber 6.

According to the invention, there is provided a procedure where the maximal laser-lens separation $Z_1$, radius of curvature Rc and conic constant k can be selected in order to create a collimated beam within a specified range (always less than the clear aperture), so as to minimize crosstalk during light collection.

The maximal laser-lens separation ($Z_1$) (the distance between VCSEL 1 and surface 3) is determined by the VCSEL optical path and numerical aperture (NA):

$$Z_1 = \frac{\frac{D}{2} - L \cdot \tan\left[\sin^{-1}\left(\frac{NA}{n_{GaAs}}\right)\right]}{\tan\left[\sin^{-1}\left(\frac{NA}{n_{freespace}}\right)\right]} \leq 0.21 \text{ mm}$$

where D is the microlens diameter; L is the GaAs substrate thickness; and $n_{GaAs}$, $n_{freespace}$ are the refractive indices of the substrate and free space, respectively. It will be appreciated that the laser-lens separation ($Z_1$) can range from 0 to 0.21 mm, above which light will not reach the lens face. A convenient value for this separation is 50 μm, which ensures that the filling of the lens will not exceed its diameter, thereby minimizing the probability that a skew ray will be scattered from one lens to its neighbor. According to one exemplary embodiment, D is 0.24 mm and L is 0.625 mm; given $Z_1$=0.05 mm, the illuminated MLA back surface 3 fill is about 0.07 mm. Since: NA ~h/r where h is the lens sag and r (=D/2) is the lens radius (for example, NA=0.3, r=0.12 mm), we can approximate the sag (~0.036) (this approximation is an initial optimization value) and find preliminary values for the radius of curvature ($R_C$) and conic constant (k) for microlens back surface 3:

$$h = \frac{1}{R_C} \frac{r^2}{1 + \sqrt{1(k+1)\frac{r^2}{R_C^2}}}$$

Using optical ray tracing and following lens optimization, we find that $R_C$ ~0.1 mm, k ~−1.8, the lens sag is increased to 0.056, resulting in a collimated beam within about 0.08 mm of the clear aperture, thereby minimizing crosstalk between adjacent micro-lenses. It will be appreciated that $R_C$ can vary by about ±5%, while k can vary by about ±10%.

The fiber-facing surface 5 is defined with respect to the fiber parameters: NA and core diameter. Using typical values of most optical fibers, NA=0.2 and core diameter=0.05 mm, Rc, k and $Z_2$ of fiber-facing surface 5 are selected according to these values, as follows.

Efficient coupling and minimal crosstalk requirements suggest that the image height be considerably smaller than the core radius, with an incidence angle smaller than the fiber's acceptance angle which, in this case, is about 11.5°. Following the arguments given above, we find that the sag is on the order of ~0.024. After optimization, and setting the lens—fiber separation at $Z_2$=650, we find $R_C$ ~0.27 and k ~−5.0 and the sag ~0.023; the spot radius on the fiber core is the sum of the geometric and diffraction spot sizes: H'+ϵ'(diff)=0.0133+ 0.0053=±0.019 mm, where H' is the image height and ϵ'(diff) the diffractive point spread function radius. This spot size (projected on the aperture of fiber 6) is small enough to allow for a tolerance margin of 0.0064 mm, which can be used to compensate for alignment errors. The diameter of this spot, i.e., the beam spot which is focused (i.e., at its minimal size) on the fiber aperture is the desired beam diameter.

Thus, the $R_C$ and k of fiber facing surface 5 are selected in order to create a focused beam having an incidence angle within a specified range, which is less than the fiber's acceptance angle, so that the diameter of the spot on the fiber's core is small enough to allow for alignment errors.

While the invention has been described with respect to a limited number of embodiments, it will be appreciated that many variations, modifications and other applications of the invention may be made. It will further be appreciated that the invention is not limited to what has been described hereinabove merely by way of example. Rather, the invention is limited solely by the claims which follow.

The invention claimed is:

1. An interconnect system comprising:
a 2-dimensional array of optical light sources;
a 2-dimensional array of light transmission elements;
a 2-dimensional array of micro lenses;
said array of micro lenses being disposed between 10-200 μm distance from said optical light sources and aligned in registration with said array of optical light sources, said array of micro lenses being disposed between the array of optical light sources and the array of light transmission elements;
each micro lens comprising an optical light source facing surface, a micro lens body, a light transmission element-facing surface, and a clear aperture;
said optical light source facing surface and said light transmission element-facing surface being shaped to provide a laser beam in said micro lens body of smaller diameter than said clear aperture for focusing said beam onto said fiber aperture;
said optical light source facing surface having a radius of curvature (Rc) of about 0.1 mm±5%, a conic constant (k) of about −1.8, and lens sag of about 0.056 mm, to create a collimated beam less than said clear aperture; and
said light transmission element-facing surface having an Rc of about 0.27 mm±5%, k of about −5.0±10% and a sag of about 0.023 mm.

2. The interconnect system according to claim 1, wherein:
said array of optical light sources include a 2-dimensional array of VCSELs; and
said array of light transmission elements include a two-dimensional array of optical fibers, each of said fibers disposed in registration with an associated VCSEL.

3. The interconnect system according to claim 1, wherein values for the radius of curvature (Rc) and conic constant (k) for said optical light source facing surface are calculated by:

$$h = \frac{1}{R_C} \cdot \frac{r^2}{1 + \sqrt{1 - (k+1) \cdot \frac{r^2}{R_C^2}}}$$

where h is the lens sag and r (=D/2) is the lens radius.

4. A micro lens for coupling light from an optical light source to a light transmission element, the micro lens comprising:
an optical light source facing surface, a micro lens body, a light transmission element-facing surface, and a clear aperture;
wherein said optical light source facing surface has a radius of curvature (Rc) of about 0.1 mm±5%, a conic constant (k) of about −1.8±10%, and a lens sag of about 0.056 mm, to create a collimated beam less than said clear aperture; and
wherein said light transmission element-facing surface has an Rc of about 0.27 mm±5%, k of about −5.0±10% and a sag of about 0.023 mm.

5. The micro lens according to claim 4, wherein values for the radius of curvature (Rc) and conic constant (k) for said optical light source facing surface are calculated by:

$$h = \frac{1}{R_C} \cdot \frac{r^2}{1 + \sqrt{1 - (k+1) \cdot \frac{r^2}{R_C^2}}}$$

where h is the lens sag and r (=D/2) is the lens radius.

6. A method for optimizing coupling between an optical light source and a light transmission element, the method comprising:
forming a micro lens having a clear aperture, an optical light source facing surface and a light transmission element-facing surface;
shaping said optical light source facing surface with a radius of curvature (Rc) of about 0.1 mm±5%, a conic constant (k) of about −1.8±10%, and a lens sag of about 0.056 mm, to create a collimated beam less than said clear aperture;
shaping said light transmission element-facing surface with Rc of about 0.27 mm±5%, k of about −5.0±10% and sag of about 0.023 mm, to create an incidence angle of a focused beam less than an acceptance angle of the optical light transmission element;
disposing said micro lens between the optical light source and the optical light transmission element at a distance between 10-200 μm from said optical light source.

7. The method according to claim 6, further comprising:
providing a 2-dimensional array of said optical light source;
providing a 2-dimensional array of said light transmission element;
providing a 2-dimensional array of said micro lens;
disposing said array of light transmission elements in registration with said array of optical light sources; and
disposing said array of micro lenses between said array of optical light sources and said array of light transmission elements at a distance $Z_1$ between 10-200 μm from said array of light sources, said array of micro lenses being aligned in registration with said array of optical light sources to form an optical interconnect system.

8. The method according to claim 7, wherein said distance ($Z_1$) is calculated as follows:

$$Z_1 = \frac{\frac{D}{2} - L \cdot \tan\left[\sin^{-1}\left(\frac{NA}{n_{GaAs}}\right)\right]}{\tan\left[\sin^{-1}\left(\frac{NA}{n_{freespace}}\right)\right]} \leq 0.21 \text{ mm}$$

where D is the micro lens clear aperture; L is the substrate thickness, and $n_{GaAs}$, $n_{freespace}$ are the refractive indices of a substrate and the free space, respectively.

9. The method according to claim 6, wherein the optical light source is a laser light source and the light transmission element is an optical fiber.

10. The method according to claim 6, wherein values for the radius of curvature (Rc) and conic constant (k) for said optical light source facing surface of each micro lens are calculated by:

$$h = \frac{1}{R_C} \cdot \frac{r^2}{1 + \sqrt{1 - (k+1) \cdot \frac{r^2}{R_C^2}}}.$$

* * * * *